United States Patent
Makimizu et al.

(10) Patent No.: US 10,988,836 B2
(45) Date of Patent: Apr. 27, 2021

(54) METHOD FOR PRODUCING HIGH-STRENGTH GALVANIZED STEEL SHEET

(71) Applicant: JFE STEEL CORPORATION, Tokyo (JP)

(72) Inventors: Yoichi Makimizu, Tokyo (JP); Yoshitsugu Suzuki, Tokyo (JP); Gentaro Takeda, Tokyo (JP); Hiroshi Hasegawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 222 days.

(21) Appl. No.: 16/083,678

(22) PCT Filed: Feb. 16, 2017

(86) PCT No.: PCT/JP2017/005603
§ 371 (c)(1),
(2) Date: Sep. 10, 2018

(87) PCT Pub. No.: WO2017/154494
PCT Pub. Date: Sep. 14, 2017

(65) Prior Publication Data
US 2020/0199726 A1    Jun. 25, 2020

(30) Foreign Application Priority Data

Mar. 11, 2016 (JP) .............................. JP2016-047817
Jan. 5, 2017 (JP) .............................. JP2017-000511

(51) Int. Cl.
*C23C 2/02* (2006.01)
*C21D 9/46* (2006.01)
(Continued)

(52) U.S. Cl.
CPC ................. *C23C 2/02* (2013.01); *C21D 1/26* (2013.01); *C21D 1/76* (2013.01); *C21D 9/46* (2013.01);
(Continued)

(58) Field of Classification Search
CPC .... C23C 2/02; C23C 2/28; C23C 2/12; C23C 2/04; C22C 38/007–60; C21D 9/46; C21D 8/005–0294
See application file for complete search history.

(56) References Cited

U.S. PATENT DOCUMENTS

| 8,911,574 B2 | 12/2014 | Ootsuka et al. |
| 9,340,859 B2 * | 5/2016 | Miyata ..................... C21D 1/76 |

(Continued)

FOREIGN PATENT DOCUMENTS

| CN | 104053796 A | 9/2014 |
| CN | 104245996 A | 12/2014 |

(Continued)

OTHER PUBLICATIONS

Apr. 4, 2017 International Search Report issued in International Patent Application No. PCT/JP2017/005603.

(Continued)

*Primary Examiner* — Alexandra M Moore
*Assistant Examiner* — Austin Pollock
(74) *Attorney, Agent, or Firm* — Oliff PLC (57) ABSTRACT

A method for producing a high-strength galvanized steel sheet having excellent fatigue resistance properties. The method includes an oxidation processing in which a steel sheet is heated at a temperature of 400 to 750° C. in an atmosphere having an $O_2$ concentration of 1000 ppm by volume or more and a $H_2O$ concentration of 1000 ppm by volume or more, and the steel sheet is heated at a temperature of 600 to 850° C. in an atmosphere having an $O_2$ (Continued)

concentration of less than 1000 ppm by volume and a $H_2O$ concentration of 1000 ppm by volume or more. The method also includes reduction-annealing in which the steel sheet is heated at a heating rate of 0.1° C./sec or more to a temperature of 650 to 900° C. in an atmosphere having a $H_2$ concentration of 5 to 30 vol % and a $H_2O$ concentration of 10 to 1000 ppm by volume.

14 Claims, 1 Drawing Sheet

(51) Int. Cl.

| | |
|---|---|
| C22C 38/02 | (2006.01) |
| C22C 38/04 | (2006.01) |
| C23C 2/06 | (2006.01) |
| C21D 1/26 | (2006.01) |
| C22C 38/08 | (2006.01) |
| C21D 1/76 | (2006.01) |
| C22C 38/00 | (2006.01) |
| C22C 38/06 | (2006.01) |
| C22C 38/12 | (2006.01) |
| C21D 9/56 | (2006.01) |
| C22C 38/28 | (2006.01) |
| C22C 38/14 | (2006.01) |
| C22C 38/16 | (2006.01) |
| C22C 38/22 | (2006.01) |
| C22C 38/26 | (2006.01) |
| C22C 38/32 | (2006.01) |
| C22C 38/38 | (2006.01) |
| C22C 38/60 | (2006.01) |

(52) U.S. Cl.
CPC ............. *C22C 38/02* (2013.01); *C22C 38/04* (2013.01); *C22C 38/08* (2013.01); *C23C 2/06* (2013.01); *C21D 9/561* (2013.01); *C22C 38/008* (2013.01); *C22C 38/06* (2013.01); *C22C 38/12* (2013.01); *C22C 38/14* (2013.01); *C22C 38/16* (2013.01); *C22C 38/22* (2013.01); *C22C 38/26* (2013.01); *C22C 38/28* (2013.01); *C22C 38/32* (2013.01); *C22C 38/38* (2013.01); *C22C 38/60* (2013.01); *C22C 2204/00* (2013.01)

(56) References Cited

U.S. PATENT DOCUMENTS

| | | | | |
|---|---|---|---|---|
| 2009/0123651 | A1* | 5/2009 | Okada | C23C 2/28 |
| | | | | 427/319 |
| 2012/0037281 | A1 | 2/2012 | Ono et al. | |
| 2012/0125491 | A1 | 5/2012 | Meurer et al. | |
| 2014/0174608 | A1* | 6/2014 | Miyata | C23C 2/02 |
| | | | | 148/243 |
| 2014/0234655 | A1* | 8/2014 | Takashima | C22C 38/06 |
| | | | | 428/659 |
| 2015/0345002 | A1* | 12/2015 | Blumenau | C23C 2/40 |
| | | | | 148/533 |
| 2016/0017452 | A1* | 1/2016 | Puerta Velasquez | C22C 38/32 |
| | | | | 148/531 |
| 2016/0304980 | A1* | 10/2016 | Rotole | C23C 2/02 |
| 2016/0304982 | A1 | 10/2016 | Makimizu et al. | |
| 2019/0242000 | A1* | 8/2019 | Makimizu | C21D 1/76 |

FOREIGN PATENT DOCUMENTS

| | | |
|---|---|---|
| EP | 2806043 A1 | 11/2014 |
| EP | 2840161 A1 | 2/2015 |
| EP | 2942419 A1 | 11/2015 |
| EP | 3000908 A1 | 3/2016 |
| EP | 3502300 A1 | 6/2019 |
| JP | S55-122865 A | 9/1980 |
| JP | H07-034210 A | 2/1995 |
| JP | 2004-211157 A | 7/2004 |
| JP | 2005-060742 A | 3/2005 |
| JP | 2007-291498 A | 11/2007 |
| JP | 4-202630 B2 | 12/2008 |
| JP | 4-202631 B2 | 12/2008 |
| JP | 4-202632 B2 | 12/2008 |
| JP | 4-202633 B2 | 12/2008 |
| JP | 4-254531 B2 | 4/2009 |
| JP | 4-254532 B2 | 4/2009 |
| JP | 2011-214042 A | 10/2011 |
| JP | 4791482 B2 | 10/2011 |
| JP | 2012-149307 A | 8/2012 |
| JP | 2012-251192 A | 12/2012 |
| JP | 2014-19935 A | 2/2014 |
| KR | 10-2015-0123919 A | 11/2015 |
| WO | 2014/188697 A1 | 11/2014 |
| WO | 2015/087549 A1 | 6/2015 |
| WO | WO-2015087549 A1 * | 6/2015 ............... C21D 9/46 |

OTHER PUBLICATIONS

Apr. 12, 2019 Office Action issued in Chinese Patent Application No. 201780016334.
Jul. 17, 2019 extended European Search Report issued in European Patent Application No. 17762837.7.
Jan. 29, 2016 Notice of Allowance issued in U.S. Appl. No. 14/119,656.
Jun. 17, 2020 Notice of Allowance issued in Korean Patent Application No. 10-2018-7025677.
Feb. 22, 2021 Office Action issued in U.S. Appl. No. 16/343,831.
Fonstein; "Advanced High Strength Sheet Steels": Aug. 14, 2015; Springer; pp. 19-21.

* cited by examiner

METHOD FOR PRODUCING HIGH-STRENGTH GALVANIZED STEEL SHEET

TECHNICAL FIELD

The present disclosure relates to a method for producing a high-strength galvanized steel sheet including, as the base material, a high-strength steel sheet containing Si.

BACKGROUND ART

These days, surface-treated steel sheets having corrosion protection properties imparted on the base material steel sheet are used in fields of, for example, automobiles, home appliances, and construction materials. Particularly, galvanized steel sheets and galvannealed steel sheets, which have excellent corrosion protection properties, are used. Moreover, from the standpoint of improving the fuel economy of automobiles and the collision safety characteristics of automobiles, the use of a high-strength steel sheet in automobiles has been promoted in an attempt to reduce the thickness of the vehicle body material by increasing its strength to achieve a weight reduction and strength increase of the vehicle body itself.

Typically, galvanized steel sheets are produced by subjecting a base material steel sheet to recrystallization annealing in an annealing furnace of a CGL and thereafter to hot-dip galvanizing processing. As the base material, a steel sheet obtained by, for example, hot rolling of a slab and cold rolling may be used. Galvannealed steel sheets are produced by performing hot-dip galvanizing and thereafter further performing alloying processing.

An effective way to increase the strength of a steel sheet is addition of Si and/or Mn. During continuous annealing, however, Si and Mn become oxidized even in a reducing $N_2+H_2$ gas atmosphere, in which Fe is not oxidized (in which Fe oxide is reduced), and form oxides of Si and/or Mn in the surface portion of the steel sheet. During galvanizing processing, oxides of Si and/or Mn decrease the wettability between molten zinc and the base steel sheet, and thus steel sheets containing Si and/or Mn often have bare spots. Even if no bare spots are formed, a problem of poor coating adhesion exists.

Patent Literature 1 discloses a method for producing a galvanized steel sheet including, as the base material, a high-strength steel sheet containing high amounts of Si and Mn. In the method, a steel sheet surface oxide film is formed and thereafter reduction-annealing is performed. According to Patent Literature 1, however, it is impossible to achieve good coating adhesion consistently.

On the other hand, Patent Literature 2 to 8 disclose technologies in which the oxidation rate and the amount of reduction are limited or an attempt is made to stabilize the effect by actually measuring the thickness of the oxide film in the oxidation zone and control the oxidation conditions and the reduction conditions based on the actual measurement results.

Furthermore, Patent Literature 9 to 11 limits the gas composition including, for example, $O_2$, $H_2$, and $H_2O$ of the atmosphere for the oxidation-reduction process.

CITATION LIST

Patent Literature

PTL 1: Japanese Unexamined Patent Application Publication No. 55-122865
PTL 2: Japanese Unexamined Patent Application Publication No. 4-202630
PTL 3: Japanese Unexamined Patent Application Publication No. 4-202631
PTL 4: Japanese Unexamined Patent Application Publication No. 4-202632
PTL 5: Japanese Unexamined Patent Application Publication No. 4-202633
PTL 6: Japanese Unexamined Patent Application Publication No. 4-254531
PTL 7: Japanese Unexamined Patent Application Publication No. 4-254532
PTL 8: Japanese Unexamined Patent Application Publication No. 7-34210
PTL 9: Japanese Unexamined Patent Application Publication No. 2004-211157
PTL 10: Japanese Unexamined Patent Application Publication No. 2005-60742
PTL 11: Japanese Unexamined Patent Application Publication No. 2007-291498

SUMMARY

Technical Problem

It has been found that, if a method for producing a galvanized steel sheet disclosed in Patent Literature 1 to 8 is employed, oxides of Si and/or Mn form in the surface of the steel sheet during continuous annealing, and as result, a sufficient coating adhesion is not necessarily achieved.

There has been a problem in that, if a production method disclosed in Patent Literature 9 and 10 is employed, although coating adhesion is improved, excessive oxidation in the oxidation zone results in a so-called pick-up phenomenon, in which oxide scales are deposited on furnace rolls, which causes indentation flaws in the steel sheet.

It has been found that the production method disclosed in Patent Literature 11 is effective in inhibiting the pick-up phenomenon but does not necessarily achieve good workability and fatigue resistance properties. It has also been found that good coating adhesion is not achieved.

The present disclosure has been made in view of the above circumstances and is directed toward providing a method for producing a high-strength galvanized steel sheet having excellent coating adhesion, workability, and fatigue resistance properties.

Solution to Problem

As described above, an effective way to increase the strength of steel is addition of a solid solution strengthening element, such as Si and Mn. High-strength steel sheets to be used in automobile applications are required to have an improved balance between strength and ductility because such steel sheets are to be subjected to press forming. For such requirements, since Si and Mn provide an advantage of being capable of increasing the strength of steel without compromising its ductility, a Si-containing steel is very useful as a high-strength steel sheet. However, production of a high-strength galvanized steel sheet including, as the base material, a Si-containing steel or a Si- and Mn-containing steel poses the following problem.

Si and/or Mn, in an annealing atmosphere, form oxides of Si and/or Mn in the surface portion of the steel sheet and decrease the wettability between the steel sheet and molten zinc. As a result, surface defects, such as bare spots, occur. Even if no bare spots are formed, coating adhesion decreases significantly. The reason is considered that the oxides of Si and/or Mn, which are formed in the surface of the steel sheet, remain at the interface between the coating layer and the steel sheet, which decrease coating adhesion.

Furthermore, in alloying processing, after hot-dip galvanizing processing, a reaction between Fe and Zn is inhibited in the case of Si-containing steels. Thus, relatively high temperature alloying processing is necessary to enable normal progression of alloying. Alloying processing at a high temperature, however, results in a failure to achieve sufficient workability.

It was found that a cause of the problem of a failure to achieve sufficient workability in the case of performing alloying processing at high temperature is that the retained austenite phase in the steel, which is necessary to obtain sufficient ductility, decomposes into the pearlite phase, which results in a failure to achieve sufficient workability. In addition, it was found that, in the case that hot-dip galvanizing processing and alloying processing are performed after performing cooling to a temperature lower than or equal to the Ms temperature and then reheating before hot-dip galvanizing processing, tempering of the martensite phase, which is a phase for obtaining sufficient strength, occurs, which results in a failure to achieve sufficient strength. Thus, Si-containing steel poses a problem in that the alloying temperature is high, which results in a failure to obtain desired mechanical property values.

Furthermore, an effective way to prevent Si from being oxidized in the surface portion of the steel sheet is to perform reduction-annealing after performing oxidation processing. However, during the process, oxides of Si form along grain boundaries in the interior of the surface layer of the steel sheet. This was found to result in poor fatigue resistance properties. This is considered to be because fatigue cracks propagate with the oxides formed along grain boundaries acting as initiation sites.

Studies were conducted based on the above, and consequently the following findings were obtained. In the case that a high-strength steel sheet containing Si and/or Mn is the base material, performing reduction-annealing after performing oxidation processing is effective in inhibiting Si and/or Mn from being oxidized in the surface portion of the steel sheet, which can cause a decrease in the wettability between the steel sheet and molten zinc. In the process, the $O_2$ concentration in the atmosphere used to perform the oxidation processing may be varied between the first stage and the second stage. This makes it possible to obtain a sufficient amount of oxides of iron, which is necessary to inhibit Si and Mn from being oxidized in the surface of the steel sheet, and can also prevent pick-up due to oxides of iron. Furthermore, the low $H_2O$ concentration in the heating zone for the reduction-annealing process, can further accelerate a reduction reaction of oxides of iron and prevent pick-up. Further, to address high temperature alloying processing in the case of Si-containing steel, the $H_2O$ concentration in the soaking zone for the reduction-annealing process, which is a high temperature region in which an internal oxidation reaction is accelerated, may be controlled to be a high concentration, and more preferably, the alloying temperature may be specified in accordance with the relationship with the $H_2O$ concentration in the soaking zone. This can lower the alloying temperature to improve workability and fatigue resistance properties. In addition, coating adhesion can be improved. Furthermore, by controlling the temperature variation in the soaking zone, excellent mechanical property values can also be obtained.

That is, the following was found. Oxidation processing with a controlled $O_2$ concentration may be performed and reduction-annealing with a controlled $H_2O$ concentration may be performed, and preferably, alloying processing at a temperature in accordance with the $H_2O$ concentration in the soaking zone may be performed. As a result, a high-strength galvannealed steel sheet having excellent coating adhesion, workability, and fatigue resistance properties can be obtained.

The present disclosure has been made based on the above findings, and the exemplary embodiments are as follows.

[1] A method for producing a high-strength galvanized steel sheet, the method including using a steel sheet containing a chemical composition, in mass %, C: 0.3% or less, Si: 0.1 to 2.5%, Mn: 0.5 to 3.0%, P: 0.100% or less, and S: 0.0100% or less with a balance of Fe and incidental impurities, performing oxidation processing on the steel sheet, thereafter performing reduction-annealing on the steel sheet, and thereafter performing hot-dip galvanizing processing on the steel sheet, wherein the oxidation processing is performed in such a manner that, in a first stage, the steel sheet is heated at a temperature of 400 to 750° C. in an atmosphere having an $O_2$ concentration of 1000 ppm by volume or more and a $H_2O$ concentration of 1000 ppm by volume or more, and, in a second stage, the steel sheet is heated at a temperature of 600 to 850° C. in an atmosphere having an $O_2$ concentration of less than 1000 ppm by volume and a $H_2O$ concentration of 1000 ppm by volume or more, and the reduction-annealing is performed in such a manner that, in a heating zone, the steel sheet is heated at a heating rate of 0.1° C./sec or more to a temperature of 650 to 900° C. in an atmosphere having a $H_2$ concentration of 5 to 30 vol % and a $H_2O$ concentration of 10 to 1000 ppm by volume with a balance of $N_2$ and incidental impurities, and thereafter, in a soaking zone, the steel sheet is soaked and held for 10 to 300 seconds with a temperature variation in the soaking zone of ±20° C. or less in an atmosphere having a $H_2$ concentration of 5 to 30 vol % and a $H_2O$ concentration of 500 to 5000 ppm by volume with a balance of $N_2$ and incidental impurities.

[2] The method for producing a high-strength galvanized steel sheet according to [1], wherein the $H_2O$ concentration in the soaking zone>the $H_2O$ concentration in the heating zone.

[3] The method for producing a high-strength galvanized steel sheet according to [1] or [2], wherein the $H_2O$ concentration in the heating zone is 10 ppm by volume or more and less than 500 ppm by volume and the $H_2O$ concentration in the soaking zone is more than 1000 ppm by volume and 5000 ppm by volume or less.

[4] The method for producing a high-strength galvanized steel sheet according to any one of [1] to [3], wherein the oxidation processing is performed in a direct fired furnace (DFF) or a non-oxidation furnace (NOF), and an air ratio in the first stage is 1.0 or more and less than 1.3 and an air ratio in the second stage is 0.7 or more and less than 0.9.

[5] The method for producing a high-strength galvanized steel sheet according to any one of [1] to [4], wherein, in the soaking zone for the reduction-annealing, a difference in the $H_2O$ concentration between upper and lower sections in an annealing furnace is 2000 ppm by volume or less.

[6] The method for producing a high-strength galvanized steel sheet according to any one of [1] to [5], wherein the hot-dip galvanizing processing is performed in a hot-dip galvanizing bath having a chemical composition containing an effective Al concentration in the bath of 0.095 to 0.175 mass %, with a balance of Zn and incidental impurities.

[7] The method for producing a high-strength galvanized steel sheet according to any one of [1] to [5], wherein the hot-dip galvanizing processing is performed in a hot-dip galvanizing bath having a chemical composition containing an effective Al concentration in the bath of 0.095 to 0.115 mass %, with a balance of Zn and incidental impurities, and thereafter alloying processing is performed for 10 to 60 seconds at a temperature T (° C.), which satisfies the following formula.

$$-50 \log([H_2O])+650 \leq T \leq -40 \log([H_2O])+680$$

Here, $[H_2O]$ represents a $H_2O$ concentration (ppm by volume) in the soaking zone during the reduction-annealing.

[8] The method for producing a high-strength galvanized steel sheet according to any one of [1] to [7], wherein the chemical composition of the steel sheet further contains, in mass %, at least one of Al: 0.01 to 0.1%, Mo: 0.05 to 1.0%, Nb: 0.005 to 0.05%, Ti: 0.005 to 0.05%, Cu: 0.05 to 1.0%, Ni: 0.05 to 1.0%, Cr: 0.01 to 0.8%, B: 0.0005 to 0.005%, Sb: 0.001 to 0.10%, and Sn: 0.001 to 0.10%.

It is to be noted that "high strength" in the present disclosure is a tensile strength, TS, of 440 MPa or more. Furthermore, the high-strength galvanized steel sheet of the present disclosure encompasses galvanized steel sheets including a cold-rolled steel sheet and a hot-rolled steel sheet as the base material. The high-strength galvanized steel sheet also encompasses galvanized steel sheets subjected to hot-dip galvanizing processing and hot-dip galvanizing processing and further to alloying processing.

Advantageous Effects

The present disclosure provides high-strength galvanized steel sheets having excellent coating adhesion, workability, and fatigue resistance properties.

DESCRIPTION OF EMBODIMENTS

The exemplary embodiments of the present disclosure will now be described specifically. In the following descriptions, the unit for the contents of the elements in the steel chemical composition and the contents of the elements in the coating layer chemical composition is "mass %", and the contents are indicated simply with "%" unless otherwise specified. The unit for the $O_2$ concentration, $H_2O$ concentration, and $H_2$ concentration is "vol %" or "ppm by volume", and the concentrations are indicated simply with "%" or "ppm" unless otherwise specified.

The chemical composition of the steel will be described.

C: 0.3% or Less

Inclusion of C in an amount of more than 0.3% decreases weldability, and thus the C content is not more than 0.3%. On the other hand, C causes formation of steel structure constituents, such as a retained austenite phase (hereinafter sometimes referred to as retained γ phase) and a martensite phase, thereby facilitating improvement in workability. Thus, it is preferable that the C content not be less than 0.025%.

Si: 0.1 to 2.5%

Si is an element effective for strengthening steel to obtain good material quality. A Si content of less than 0.1% results in the need for costly alloying elements to achieve high strength and is thus not preferable for economic reasons. On the other hand, it is known that, in Si-containing steels, inhibition of an oxidation reaction in oxidation processing occurs. Thus, a Si content of more than 2.5% results in inhibition of formation of the oxide film in oxidation processing. In addition, the alloying temperature also increases, and as a result, it is difficult to obtain desired mechanical properties. Thus, the Si content is 0.1% or more and 2.5% or less.

Mn: 0.5 to 3.0%

Mn is an element effective for increasing the strength of steel. Mn is included in an amount of 0.5% or more in order to obtain sufficient mechanical properties and strength. On the other hand, a Mn content of more than 3.0% may result in difficulties in achieving sufficient weldability, coating adhesion, and balance between strength and ductility. Thus, the Mn content is 0.5% or more and 3.0% or less.

P: 0.100% or Less

P is an element effective for increasing the strength of steel. A P content of more than 0.100%, however, may cause embrittlement due to grain boundary segregation, which may decrease impact resistance. Thus, the P content is not more than 0.100%.

S: 0.0100% or Less

S forms inclusions such as MnS and decreases impact resistance and causes cracking along the metal flow in the weld. For this reason, it is preferable that the S content be as low as possible. Thus, the S content is not more than 0.0100%.

The balance is Fe and incidental impurities.

To control the balance between strength and ductility, it is possible to optionally add one or more elements selected from Al: 0.01 to 0.1%, Mo: 0.05 to 1.0%, Nb: 0.005 to 0.05%, Ti: 0.005 to 0.05%, Cu: 0.05 to 1.0%, Ni: 0.05 to 1.0%, Cr: 0.01 to 0.8%, B: 0.0005 to 0.005%, Sb: 0.001 to 0.10%, and Sn: 0.001 to 0.10%.

Reasons for the limitations for the appropriate amounts of addition of these elements, in the case of being added, are as follows.

Al is thermodynamically the easiest to be oxidized. Thus Al oxidizes before Si and Mn and has the effect of inhibiting Si and Mn from being oxidized in the surface of the steel sheet to accelerate their oxidation in the inner portion of the steel sheet. This effect is produced when the Al content is 0.01% or more. On the other hand, an Al content of more than 0.1% increases the cost. Thus, it is preferable, in the case of adding Al, that the content be 0.01% or more and 0.1% or less.

A Mo content of less than 0.05% makes it difficult to produce the strength adjustment effect and the coating adhesion improvement effect, which is produced when Mo is added in combination with Nb, Ni, and Cu. On the other hand, a Mo content of more than 1.0% increases the cost. Thus, it is preferable, in the case of adding Mo, that the content be 0.05% or more and 1.0% or less.

A Nb content of less than 0.005% makes it difficult to produce the strength adjustment effect and the coating adhesion improvement effect, which is produced when Nb is added in combination with Mo. On the other hand, a Nb content of more than 0.05% increases the cost. Thus, it is preferable, in the case of adding Nb, that the content be 0.005% or more and 0.05% or less.

A Ti content of less than 0.005% makes it difficult to produce the strength adjustment effect. A Ti content of more than 0.05% decreases coating adhesion. Thus, it is preferable, in the case of adding Ti, that the content be 0.005% or more and 0.05% or less.

A Cu content of less than 0.05% makes it difficult to produce the accelerating effect of the retained γ phase formation and the coating adhesion improvement effect, which is produced when Cu is added in combination with Ni and Mo. On the other hand, a Cu content of more than 1.0% increases the cost. Thus, it is preferable, in the case of adding Cu, that the content be 0.05% or more and 1.0% or less.

A Ni content of less than 0.05% makes it difficult to produce the accelerating effect of the retained γ phase formation and the coating adhesion improvement effect, which is produced when Ni is added in combination with Cu and Mo. On the other hand, a Ni content of more than 1.0% increases the cost. Thus, it is preferable, in the case of adding Ni, that the content be 0.05% or more and 1.0% or less.

A Cr content of less than 0.01% makes it difficult to achieve hardenability and, as a result, may degrade the balance between strength and ductility. On the other hand, a Cr content of more than 0.8% increases the cost. Thus, it is preferable, in the case of adding Cr, that the content be 0.01% or more and 0.8% or less.

B is an element effective for improving the hardenability of steel. A B content of less than 0.0005% makes it difficult to produce the hardening effect. A B content of more than 0.005% produces the effect of accelerating oxidation of Si in the surface portion of the steel sheet and, as a result, decreases coating adhesion. Thus, it is preferable, in the case of adding B, that the content be 0.0005% or more and 0.005% or less.

Sb and Sn are elements effective for inhibiting a decrease in the strength of steel by inhibiting, for example, denitrification and deboronation. To produce such effects, it is preferable that the Sb content and the Sn content each not be less than 0.001%. On the other hand, a Sb content of more than 0.10% or a Sn content of more than 0.10% decreases impact resistance. Thus, it is preferable, in the case of adding Sb and/or Sn, that the contents each be 0.001% or more and 0.10% or less.

Next, a method for producing a high-strength galvanized steel sheet, according to the present disclosure, will be described. In the present disclosure, a steel sheet having the chemical composition described above is subjected to oxidation processing and thereafter reduction-annealing, which is followed by hot-dip galvanizing processing. Optionally, the steel sheet is further subjected to alloying processing.

The oxidation processing is performed as follows. In a first stage, heating is performed at a temperature of 400 to 750° C. in an atmosphere having an $O_2$ concentration of 1000 ppm by volume or more and a $H_2O$ concentration of 1000 ppm by volume or more. In a second stage, heating is performed at a temperature of 600 to 850° C. in an atmosphere having an $O_2$ concentration of less than 1000 ppm by volume and a $H_2O$ concentration of 1000 ppm by volume or more. The reduction-annealing is performed as follows. In a heating zone, heating is performed at a heating rate of 0.1° C./sec or more to a temperature of 650 to 900° C. in an atmosphere having a $H_2$ concentration of 5 to 30 vol % and a $H_2O$ concentration of 10 to 1000 ppm by volume with a balance of $N_2$ and incidental impurities, and thereafter, in a soaking zone, soaking and holding is performed for 10 to 300 seconds with a temperature variation in the soaking zone of ±20° C. or less in an atmosphere having a $H_2$ concentration of 5 to 30 vol % and a $H_2O$ concentration of 500 to 5000 ppm by volume with a balance of $N_2$ and incidental impurities.

The hot-dip galvanizing processing is preferably performed in a hot-dip galvanizing bath having a chemical composition containing an effective Al concentration in the bath of 0.095 to 0.175 mass %, with a balance of Zn and incidental impurities.

In the alloying processing, it is preferable that the process be performed for 10 to 60 seconds at a temperature T, which satisfies the following formula.

$$-50 \log([H_2O])+650 \leq T \leq -40 \log([H_2O])+680$$

Here, $[H_2O]$ represents the $H_2O$ concentration (ppm) in the soaking zone during reduction-annealing.

First, the oxidation processing will be described. In order to increase the strength of the steel sheet, addition of, for example, Si and Mn to the steel is effective as described above. However, in the case that a steel sheet contains such elements added thereto, formation of oxides of Si and/or Mn in the surface of the steel sheet occurs during the annealing process (oxidation processing+reduction-annealing), which is performed before performing hot-dip galvanizing processing. As a result, it is difficult to obtain sufficient coatability.

Studies were conducted and the following was found. By varying the conditions for the annealing (oxidation processing+reduction-annealing), which is performed before performing hot-dip galvanizing processing, Si and Mn can be oxidized in the inner portion of the steel sheet and thus can be prevented from being oxidized in the surface of the steel sheet. As a result, coatability can be improved, and further, reactivity between the coating and the steel sheet can be enhanced, which can improve coating adhesion.

Furthermore, the following was found. An effective way to cause Si and Mn to oxidize in the inner portion of the steel sheet to prevent their oxidation in the surface of the steel sheet is to perform oxidation processing and thereafter perform reduction-annealing and hot-dip galvanizing, and optionally alloying processing. In the oxidation processing, it is necessary to obtain oxides of iron in a specific amount or more.

However, when reduction-annealing is performed with the specific amount or more of oxides of iron formed in the oxidation processing, a problem arises in that a pick-up phenomenon may occur. Thus, it is important to divide the oxidation processing into the first and second stages and to control, in each of the stages, the $O_2$ concentration in the atmosphere. In particular, it is important to perform the second-stage oxidation processing at a low $O_2$ concentration. The first-stage oxidation processing and the second-stage oxidation processing will be described below.

First-Stage Processing

Oxidation processing is actively performed in order to inhibit Si and Mn from being oxidized and form oxides of iron in the surface of the steel sheet. Thus, in order to obtain a sufficient amount of oxides of iron, the $O_2$ concentration needs to be greater than or equal to 1000 ppm. The upper limit is not particularly specified but is preferably not more than 20% the $O_2$ concentration in atmospheric air for economic reasons associated with the cost of introducing oxygen. In addition, $H_2O$, as with oxygen, has the effect of accelerating oxidation of iron, and thus the concentration is not less than 1000 ppm. The upper limit is not particularly specified but is preferably not more than 30% for economic reasons associated with the cost of humidification. Furthermore, the heating temperature needs to be 400° C. or higher to accelerate oxidation of iron. On the other hand, if the temperature is higher than 750° C., the iron becomes excessively oxidized, which can cause pick-up in the subsequent process. Thus, the heating temperature is 400° C. or higher and 750° C. or lower.

Second-Stage Processing

This is an important requirement in the present disclosure in order to prevent pick-up to achieve aesthetic surface appearance free of indentation flaws, for example. To prevent pick-up, it is important to perform reduction processing of a portion (surface layer) of the oxidized surface of the steel sheet. To carry out reduction processing, it is necessary to control the $O_2$ concentration to be less than 1000 ppm. By lowering the $O_2$ concentration, the surface layer of the oxides of iron is partially reduced, and during the subsequent process of reduction-annealing, direct contact between the annealing furnace rolls and the oxides of iron can be avoided to prevent pick-up. If the $O_2$ concentration is 1000 ppm or more, this reduction reaction does not readily occur, and thus the $O_2$ concentration is less than 1000 ppm. The $H_2O$ concentration is 1000 ppm or more in order to accelerate internal oxidation of Si and Mn, which will be described later. The upper limit is not particularly specified but, as with the first-stage oxidation processing, is preferably not more than 30% for economic reasons associated with the cost of humidification. The heating temperature is 600° C. or higher and 850° C. or lower because a reduction reaction does not readily occur at temperatures lower than 600° C., and the effect is saturated and the cost of heating also increases at temperatures higher than 850° C.

As stated above, to satisfy the conditions described above, it is necessary that the oxidation furnace include at least two zones in each of which the atmosphere can be controlled independently. In the case that the oxidation furnace includes two zones, the two zones may be allocated for the first stage and the second stage and the atmosphere control may be performed as described above. In the case that the oxidation furnace includes three or more zones, any adjacent ones of the zones may be regarded as one zone by performing the same atmosphere control in the adjacent zones. It is also possible that the first stage and the second stage may be performed in respective separate oxidation furnaces. It is preferable, however, that the same furnace be divided into two or more zones and atmosphere control be performed for each of the zones, from the standpoint of, for example, industrial productivity and practicing by modification of the currently used production line.

For the first-stage oxidation processing and the second-stage oxidation processing, it is preferable to use a direct fired furnace (DFF) or a non-oxidation furnace (NOF). A DFF or an NOF is frequently used in a hot-dip galvanizing line. With a DFF or an NOF, control of the $O_2$ concentration by controlling the air ratio is also facilitated. In addition, the use of a DFF or an NOF is preferable from the standpoint of, for example, production efficiency because the steel sheet heating rate is high, which provides advantages in that, for example, the furnace length of the heating furnace can be shortened and the line speed can be increased. In a direct fired furnace (DFF) or a non-oxidation furnace (NOF), the steel sheet is, for example, heated by mixing fuel with air and causing combustion. The fuel may be, for example, coke-oven gas (COG), which is a by-product gas in a steel works. Thus, when the ratio of air to fuel is increased, unburned oxygen remains in the flame and oxidation of the steel sheet can be accelerated by the oxygen. Thus, control of the oxygen concentration in the atmosphere can be accomplished by adjusting the air ratio. In the first-stage oxidation processing, it is preferable that the air ratio be 1.0 or more and less than 1.3 because, if the air ratio is less than 1.0, the above-mentioned atmosphere conditions may not be obtained, and if the air ratio is 1.3 or more, the iron may become excessively oxidized. In the second-stage oxidation processing, it is preferable that the air ratio be 0.7 or more and less than 0.9 because, if the air ratio is 0.9 or more, the above-mentioned atmosphere conditions may not be obtained, and if the air ratio is less than 0.7, the ratio of combustion gas used for heating increases, which leads to increased costs.

Next, the reduction-annealing, which is performed following the oxidation processing, will be described. In the reduction-annealing, oxides of iron formed in the surface of the steel sheet by the oxidation processing is reduced, and also, by using oxygen coming from the oxides of iron, internal oxides of the alloying elements, Si and Mn, are formed in the inner portion of the steel sheet. As a result, a layer of reduced iron, reduced from oxides of iron, is formed in the surface portion of the steel sheet, and Si and Mn remain, as internal oxides, in the inner portion of the steel sheet. Thus, Si and Mn are inhibited from being oxidized in the surface of the steel sheet, which prevents a decrease in the wettability between the steel sheet and molten zinc and makes it possible to achieve good coating appearance free of bare spots.

However, although good coating appearance can be achieved, inhibition of formation of oxides of Si and/or Mn in the surface of the steel sheet is not sufficient. Thus, in the case of galvanized steel sheets, which are not subjected to alloying processing, desired coating adhesion cannot be achieved. Further, in the case that a galvannealed steel sheet is produced, the alloying temperature is high, which causes, for example, decomposition of the retained austenite phase into the pearlite phase and tempering and softening of the martensite phase. As a result, desired mechanical properties cannot be obtained.

Accordingly, studies were conducted to achieve good coating adhesion and to lower the alloying temperature. Consequently, a technology was devised, in which internal oxides of Si and/or Mn are formed more actively to further inhibit formation of oxides of Si and/or Mn in the surface of the steel sheet, thereby improving coating adhesion for galvanized steel sheets, which are not subjected to alloying processing, and further, the amount of dissolved Si in the surface layer of the steel sheet is decreased to accelerate the alloying reaction in the case that alloying processing is performed.

An effective way to more actively form internal oxides of Si and/or Mn is to control the $H_2O$ concentration in the atmosphere of the soaking zone in the reduction-annealing furnace to be 500 ppm or more. This is a particularly important requirement in the present disclosure. The heating zone and the soaking zone for the reduction-annealing will be described below.

Heating Zone for Reduction-Annealing

In the heating zone for the reduction-annealing, oxides of iron, which are mostly formed in the above-described oxidation processing, need to be reduced. Accordingly, in the present disclosure, which employs the oxidation and reduction method, the $H_2O$ concentration is not more than 1000 ppm. It is preferable that the $H_2O$ concentration be less than 500 ppm. If the $H_2O$ concentration is more than 1000 ppm, the reduction of the oxides of iron formed in the oxidation processing is difficult, and thus there is a possibility that pick-up may occur in the reduction-annealing. In addition, if the oxides of iron remain at the time of the hot-dip galvanizing processing, the wettability between the steel sheet and the molten zinc may decrease, which may result in poor adhesion. Furthermore, excessive decarburization layers form, which degrade fatigue resistance properties. On the other hand, if a $H_2O$ concentration of less than 10 ppm is to be obtained, dehumidification of the atmosphere gas is necessary, and thus the need for dehumidification increases the cost for the line. Thus, the lower limit of the $H_2O$ concentration is 10 ppm. Based on the above, the $H_2O$ concentration in the heating zone is 10 to 1000 ppm by volume.

The $H_2$ concentration is 5% or more and 30% or less. If the $H_2$ concentration is less than 5%, reduction of the oxides of iron and of the naturally oxidized coating is inhibited, which increases the possibility that pick-up and bare spot defects may occur. A $H_2$ concentration of more than 30% leads to increased costs. The balance, other than $H_2O$ and $H_2$, is $N_2$ and incidental impurities.

It is necessary that the steel sheet be further heated to a temperature necessary to obtain desired mechanical properties, which include tensile strength (TS) and elongation (El). Thus, the heating rate is not less than 0.1° C./sec. If the heating rate is less than 0.1° C./sec, it is impossible to heat the steel sheet to a temperature range for obtaining desired mechanical properties. A heating rate of not less than 0.5° C./sec is preferable because heating can be accomplished with a short line length in a short time. The upper limit is not particularly specified. However, if the heating rate is more than 10° C./sec, the cost of energy for heating increases, and thus a heating rate of not more than 10° C./sec is preferable.

The heating temperature is 650 to 900° C. If the heating temperature is less than 650° C., reduction of the oxides of iron is inhibited, and in addition, desired mechanical properties, which include TS and El, cannot be obtained. If the heating temperature is more than 900° C., desired mechanical properties also cannot be obtained.

Soaking Zone for Reduction-Annealing

The $H_2O$ concentration in the soaking zone is controlled to be not less than 500 ppm. Thus, even after reduction of the oxides of iron in the heating zone, internal oxidation of Si and/or Mn occurs by oxygen coming from $H_2O$ in the atmosphere. As a result, internal oxides of Si and/or Mn are formed. Thus, it becomes difficult for Si and/or Mn to diffuse to the surface of the steel sheet, which inhibits formation of oxides in the surface of the steel sheet. Consequently, reactivity between the steel sheet and the coating layer increases, which improves coating adhesion. In addition, the amount of dissolved Si is low in the region of the surface layer of the steel sheet, with the internal oxidation formed therein. When the amount of dissolved Si is low, the surface layer of the steel sheet behaves very similarly to low Si steel. As a result, the subsequent alloying reaction is accelerated to allow progression of the alloying reaction at a low temperature. The lowered alloying temperature enables a large fraction of retained austenite phase to be maintained and thus improves ductility. Progression of tempering and softening of the martensite phase is prevented, and thus desired strength is achieved. It is preferable that the $H_2O$ concentration be more than 1000 ppm in order to further accelerate the internal oxidation within the grain interior.

On the other hand, if the $H_2O$ concentration is more than 5000 ppm, excessive decarburization layer forms, which degrades fatigue resistance properties. In addition, the need for humidification leads to increased costs. Thus, the upper limit of the $H_2O$ concentration is 5000 ppm. It is preferable that the $H_2O$ concentration not be more than 4000 ppm in order to achieve excellent fatigue resistance properties.

As described above, in the heating zone, the $H_2O$ concentration is low from the standpoint of reduction of the acid oxide, prevention of a decrease in fatigue resistance properties, and shortening of the life of the furnace body. On the other hand, in the soaking zone, the $H_2O$ concentration is high in order to more actively form internal oxides of Si and/or Mn. To further enhance these effects, it is preferable that the $H_2O$ concentration in the soaking zone>the $H_2O$ concentration in the heating zone, in the reduction-annealing.

The $H_2$ concentration is 5% or more and 30% or less. If the $H_2$ concentration is less than 5%, reduction of oxides of iron and the naturally oxidized coating, which may not be sufficiently reduced in the heating zone, is inhibited. As a result, the possibility that pick-up and bare spot defects may occur increases. A H2 concentration of more than 30% leads to increased costs. The balance, other than $H_2O$ and $H_2$, is $N_2$ and incidental impurities.

If the temperature variation in the soaking zone is outside the range of ±20° C., desired mechanical properties, which include TS and El, cannot be obtained. Thus, the temperature variation in the soaking zone is ±20° C. or less. The temperature variation in the soaking zone of ±20° C. or less can be achieved by, for example, separately controlling the temperatures of a plurality of radiant tubes used to heat the annealing furnace.

The soaking time in the soaking zone is 10 to 300 seconds. If the soaking time is less than 10 seconds, metallurgical constituents for obtaining desired mechanical properties, which include TS and El, are not formed sufficiently. If the soaking time is more than 300 seconds, productivity decreases and a long furnace length is necessary.

In the soaking zone for the reduction-annealing, it is preferable that the difference in the $H_2O$ concentration between the upper and lower sections in the furnace not be more than 2000 ppm.

Typically, the $H_2O$ concentration distribution within a reduction-annealing furnace tends to be such that the concentration is higher in the upper section of the annealing furnace and the concentration is lower in the lower section, although depending on the structure of the annealing furnace. In the case that the annealing furnace is of the vertical type, which is common for hot-dip galvanizing lines, if the difference in the $H_2O$ concentration between the upper section and the lower section is large, the steel sheet passes through regions of a high $H_2O$ concentration and of a low $H_2O$ concentration alternately. As a result, uniform formation of internal oxidation within the grain interior is difficult. To form a $H_2O$ concentration as uniform as possible, it is preferable that the difference in the $H_2O$ concentration between the upper and lower sections in the annealing furnace not be more than 2000 ppm. If the difference in the $H_2O$ concentration between the upper and lower sections is more than 2000 ppm, formation of uniform internal oxidation is difficult in some cases. Controlling the $H_2O$ concentration in the region of the lower section, in which the $H_2O$ concentration is lower, to be a $H_2O$ concentration within the range of the present disclosure necessitates excessive introduction of $H_2O$, which results in increased costs. The $H_2O$ concentrations of the upper and lower sections in the annealing furnace are $H_2O$ concentrations measured in regions of uppermost 20% of the height of the annealing furnace and of lowermost 20% of the height, respectively.

The method for controlling the $H_2O$ concentration in the reduction-annealing furnace is not particularly limited. For example, in one method, heated steam is introduced into the furnace, or in another method, $N_2$ and/or $H_2$ gas humidified by bubbling is introduced into the furnace. A humidification method using membrane exchange utilizing a hollow fiber membrane is preferable because the ability to control the dew point is further enhanced.

Next, the hot-dip galvanizing processing and the alloying processing will be described.

Figure 1:
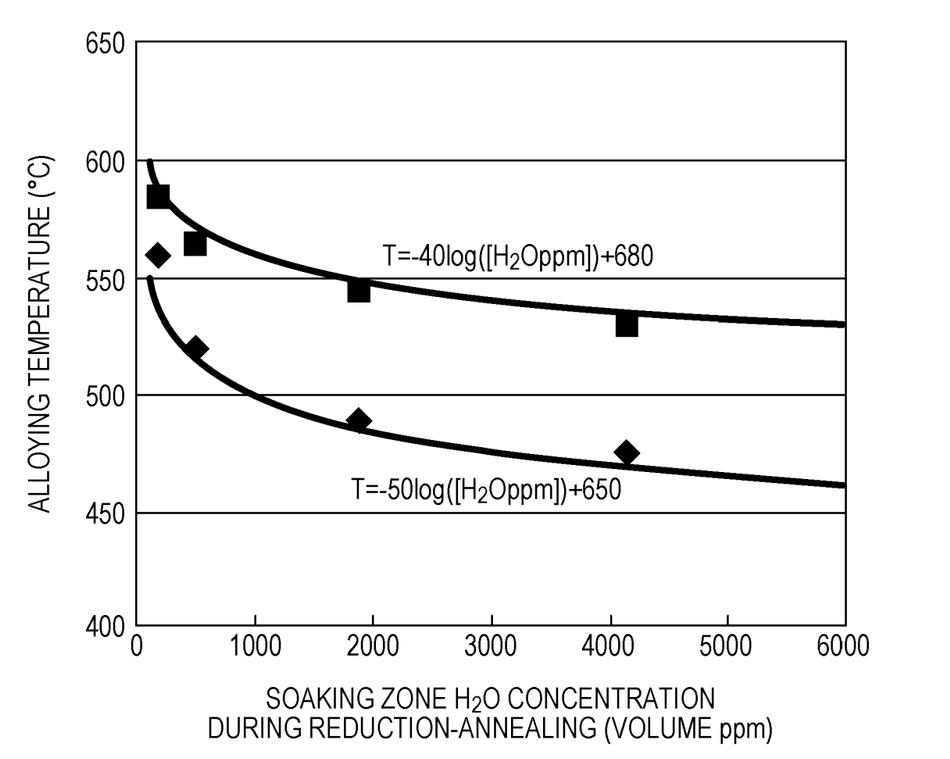
FIG. 1 is a graph illustrating a relationship between the change in the $H_2O$ concentration in the soaking zone during reduction-annealing and the alloying temperature.

As described above, it was found that the alloying reaction is accelerated by actively forming internal oxides of Si through control of the conditions for the oxidation processing and the conditions for the reduction-annealing. By using a steel sheet containing C in an amount of 0.12%, Si in an amount of 1.5%, and Mn in an amount of 2.7%, the first-stage oxidation processing was performed at 650° C. in an atmosphere having an $O_2$ concentration of 1000 ppm or more and a $H_2O$ concentration of 1000 ppm or more, and the second-stage oxidation processing was performed at 700° C. in an atmosphere having an $O_2$ concentration of less than 1000 ppm and a $H_2O$ concentration of 1000 ppm or more. Next, reduction-annealing was performed as follows. In a reduction-annealing furnace, in the heating zone, the $H_2O$ concentration was 300 ppm, the $H_2$ concentration was 15%, the heating rate was 1.5° C./sec, and the heating temperature was 850° C., and, in the soaking zone, the $H_2O$ concentration was changed, the $H_2$ concentration was 15%, the soaking zone temperature variation was −10° C., and the soaking and holding lasted for 130 seconds. Next, hot-dip galvanizing processing was performed, and alloying processing was performed at 450 to 600° C. for 25 seconds. The relationship between the change in the $H_2O$ concentration in the soaking zone and the alloying temperature was investigated. The results obtained are shown in FIG. 1. In FIG. 1, the symbol ♦ indicates the temperature at which the alloying reaction was completed, with complete transformation of the η phase, which formed before the alloying, into an Fe—Zn alloy. The symbol ■ indicates the upper limit of the temperature at which rank 3 in coating adhesion evaluation can be obtained. The evaluation was conducted by a method described in EXAMPLES, which will be described later. The lines in the graph indicate the upper and lower limit temperatures of the alloying temperature, which is defined by the following formula.

From FIG. 1, the following findings were obtained. When the alloying temperature is lower than $(-50 \log([H_2O])+650)°$ C., progression of alloying is incomplete, and as a result, the η phase remains. The remaining η phase results in color non-uniformity of the surface and thus compromises the surface appearance, and in addition, increases the frictional coefficient of the surface of the coating layer and thus decreases press-formability. If the alloying temperature is higher than $(-40 \log([H_2O])+680)°$ C., good coating adhesion cannot be achieved. Furthermore, as is apparent from FIG. 1, it is seen that, as the $H_2O$ concentration increases, the alloying temperature required decreases, which accelerates the Fe—Zn alloying reaction. The above-described effect in which mechanical property values are improved with the increase in the $H_2O$ concentration in the reduction-annealing furnace is attributable to the decrease in the alloying temperature. It is seen that precise control of the temperature for the alloying, after hot-dip galvanizing, is also necessary in order to obtain desired mechanical properties, which include TS and El.

Based on the above, in the alloying processing, it is preferable that the process be performed at a temperature T, which satisfies the following formula.

$$-50 \log([H_2O])+650 \leq T \leq -40 \log([H_2O])+680$$

Here, $[H_2O]$ represents the $H_2O$ concentration (ppm) in the soaking zone during reduction-annealing.

The alloying time is 10 to 60 seconds for reasons similar to those for the alloying temperature.

The alloying degree after the alloying processing is not particularly limited but an alloying degree of 7 to 15 mass % is preferable. If the alloying degree is less than 7 mass %, the η phase remains, which results in low press formability. If the alloying degree is more than 15 mass %, coating adhesion is low.

It is preferable that the hot-dip galvanizing processing be performed in a hot-dip galvanizing bath having a chemical composition containing an effective Al concentration in the bath of 0.095 to 0.175% (more preferably 0.095 to 0.115% in the case that alloying processing is performed), with a balance of Zn and incidental impurities. Here, the effective Al concentration in the bath is a value obtained by subtracting the Fe concentration in the bath from the Al concentration in the bath. Patent Literature 10 discloses a technology for accelerating the alloying reaction by limiting the effective Al concentration in the bath to a low concentration of 0.07 to 0.092%. In contract, the present disclosure accelerates the alloying reaction without decreasing the effective Al concentration in the bath. If the effective Al concentration in the bath is less than 0.095%, a F phase, which is a hard and brittle Fe—Zn alloy, forms after alloying processing at the interface between the steel sheet and the coating layer. As a result, coating adhesion is low in some cases. On the other hand, if the effective Al concentration in the bath is more than 0.175%, the alloying temperature increases even if the present disclosure is applied. This results in a failure to obtain desired opportunity properties, which include TS and El, and in addition, increases the amount of formation of dross in the galvanizing bath and thus poses a problem of surface defects that may be caused by deposition of dross on the steel sheet. Furthermore, the cost for addition of Al increases. If the effective Al concentration in the bath is more than 0.115%, the alloying temperature increases even if the present disclosure is applied. This may result in a failure to obtain desired mechanical properties. Thus, it is preferable that the effective Al concentration in the bath be 0.095% or more and 0.175% or less. It is more preferable, in the case of performing alloying processing, that the effective Al concentration in the bath not be more than 0.115%.

The other conditions for the hot-dip galvanizing are not limited, but, for example, the hot-dip galvanizing may be performed by immersing the steel sheet, at a sheet temperature of 440 to 550° C., in a galvanizing bath having a hot-dip galvanizing bath temperature in a typical range of 440 to 500° C. The coating weight may be adjusted by, for example, gas wiping.

Example 1

Steelmaking was performed to produce steel having chemical compositions shown in Table 1 and slabs were produced. The slabs were subjected to hot rolling, pickling, and cold rolling. Thus, cold-rolled steel sheets having a sheet thickness of 1.2 mm were obtained.

TABLE 1

| Steel sample | C | Si | Mn | P | S | Others (mass %) |
|---|---|---|---|---|---|---|
| A | 0.07 | 0.25 | 1.7 | 0.03 | 0.001 | Mo: 0.1, Nb: 0.01, Cu: 0.2 |
| B | 0.15 | 0.8 | 1.8 | 0.01 | 0.001 | Al: 0.07, Cr: 0.3 |
| C | 0.08 | 1.5 | 1.4 | 0.01 | 0.001 | Ni: 0.3, Sb: 0.01 |
| D | 0.12 | 1.4 | 1.9 | 0.01 | 0.001 | |
| E | 0.09 | 0.15 | 2.3 | 0.01 | 0.001 | Mo: 0.1, Cr: 0.6, Nb: 0.04, B: 0.001, Ti: 0.02 |
| F | 0.12 | 1.5 | 2.7 | 0.01 | 0.001 | Ti: 0.02, B: 0.001 |
| G | 0.18 | 2.1 | 2.8 | 0.01 | 0.001 | Sn: 0.01 |
| H | 0.09 | 2.7 | 1.5 | 0.01 | 0.001 | Ti: 0.02, Mo: 0.1 |
| I | 0.06 | 0.3 | 3.2 | 0.01 | 0.001 | |

Next, first-stage oxidation processing and second-stage oxidation processing were performed under the oxidation conditions shown in Table 2 in a CGL including a DFF-type oxidation furnace or an NOF-type oxidation furnace, and thereafter reduction-annealing was performed under the conditions shown in Table 2. Subsequently, hot-dip galvanizing processing was performed by using 460° C. baths having an effective Al concentration in the bath shown in Table 2. Thereafter, the coating weight was adjusted to approximately 50 g/m² per side by gas wiping, and next, alloying processing was performed at temperatures and for periods of time, in the ranges shown in Table 2.

Evaluations were performed on the galvanized steel sheets (including galvannealed steel sheets), obtained as described above, for appearance and coating adhesion. Furthermore, investigations on tensile properties and fatigue resistance properties were made. The measurement methods and the evaluation methods are described below.

Appearance

The appearance of the steel sheets produced as described above was visually observed. Steel sheets free of appearance defects, such as uneven alloying, bare spots, and indentation flaws due to pick-up, were rated as ○, steel sheets that had slight appearance defects but were generally good were rated as Δ, and steel sheets that had uneven alloying, bare spots, or indentation flaws were rated as ×.

Coating Adhesion (Non-Galvannealed Steel Sheet)

Bending was applied to the coated steel sheets by using a 90° forming tool having a tip of 2.0 R and thereafter cellophane tape (registered trademark) was applied to the outer side of the bent portion and then peeled away. As a result of this, steel sheets that had no observed coating layer delamination were rated as "○", steel sheets that had a coating delamination of not more than 1 mm or that had a coating layer blistering from the steel sheet although there was no adhesion of the coating to the tape were rated as "Δ", and steel sheets that had a delamination of greater than 1 mm of the coating layer, which adhered to the tape, were rated as "×".

(Galvannealed Steel Sheet)

Cellophane tape (registered trademark) was applied to the coated steel sheet and the steel sheet was bent at 90 degrees at the taped side and then bent back. Cellophane tape of 24 mm width was pressed against the inside of the bent portion (compressed side) in such a manner that the cellophane tape was parallel to the bent portion and then peeled away. The amount of zinc adhering to a 40 mm length portion of the cellophane tape was measured as the number of Zn counts by X-ray fluorescence. The number of Zn counts was converted to an amount per unit length (1 m) and the following criteria were used. Steel sheets that had a rank of 1 or 2 were rated as good (○), steel sheets that had a rank of 3 were rated as generally good (Δ), and steel sheets that a rank of 4 or more were rated as defective (×).

| Number of counts by X-ray fluorescence | Rank |
|---|---|
| 0 to less than 500: | 1 (good) |
| 500 or more and less than 1000: | 2 |
| 1000 or more and less than 2000: | 3 |
| 2000 or more and less than 3000: | 4 |
| 3000 or more: | 5 (poor) |

Tensile Properties

A test was conducted by a method in accordance with JIS Z 2241 by using a JIS No. 5 test piece. The tensile direction was the rolling direction. Steel sheets that had a TS×El value of more than 12000 were evaluated as having excellent ductility.

Fatigue Resistance Properties

A test was conducted under conditions including a stress ratio R: 0.05 with $10^7$ repeated cycles to determine the fatigue limit (FL) and determine the endurance ratio (FL/TS). Values of 0.60 or greater were evaluated as good fatigue resistance properties. The stress ratio R is a value defined by (minimum repeated stress)/(maximum repeated stress).

Results obtained from the above are shown in Table 2 together with the production conditions.

TABLE 2

| No. | Steel sample | Oxidizing - First stage O₂ concentration (vol ppm) | Oxidizing - First stage H₂O concentration (vol ppm) | Oxidizing - First stage Heating temperature (°C) | Oxidizing - Second stage O₂ concentration (vol ppm) | Oxidizing - Second stage H₂O concentration (vol ppm) | Oxidizing - Second stage Heating temperature (°C) | Furnace | Reduction-annealing Heating zone H₂ concentration (vol %) | Reduction-annealing Heating zone H₂O concentration (vol ppm) | Reduction-annealing Heating rate (°C/sec) | Reduction-annealing Heating temperature (°C) | Soaking zone H₂ concentration (vol %) | Soaking zone Upper H₂O concentration (vol ppm) |
|---|---|---|---|---|---|---|---|---|---|---|---|---|---|---|
| 1 | F | 20000 | 20000 | 650 | 500 | 20000 | 700 | DFF | 15 | 300 | 1.5 | 850 | 15 | 2800 |
| 2 | F | 2000 | 20000 | 700 | 500 | 20000 | 730 | DFF | 15 | 400 | 0.7 | 850 | 15 | 3800 |
| 3 | F | 25000 | 20000 | 650 | 400 | 20000 | 700 | DFF | 15 | 500 | 1.2 | 820 | 15 | 2500 |
| 4 | F | 20000 | 5000 | 650 | 500 | 5000 | 680 | DFF | 15 | 900 | 1.0 | 800 | 15 | 4800 |
| 5 | F | 20000 | 20000 | 650 | 300 | 20000 | 680 | DFF | 15 | 500 | 1.2 | 820 | 15 | 3500 |
| 6 | F | 20000 | 20000 | 730 | 200 | 20000 | 830 | DFF | 25 | 300 | 0.7 | 880 | 25 | 3200 |
| 7 | F | 20000 | 2000 | 650 | 700 | 2000 | 700 | DFF | 15 | 100 | 1.0 | 820 | 15 | 4800 |
| 8 | F | 25000 | 20000 | 650 | 400 | 20000 | 700 | DFF | 15 | 500 | 1.2 | 820 | 15 | 2500 |
| 9 | F | 20000 | 20000 | 450 | 600 | 20000 | 650 | DFF | 15 | 200 | 0.8 | 810 | 15 | 440 |
| 10 | F | 10000 | 10000 | 650 | 900 | 10000 | 700 | DFF | 10 | 600 | 1.0 | 850 | 10 | 1800 |
| 11 | F | 20000 | 20000 | 500 | 500 | 20000 | 620 | NOF | 15 | 600 | 0.7 | 790 | 15 | 2500 |
| 12 | F | 5000 | 20000 | 580 | 500 | 20000 | 700 | NOF | 15 | 300 | 1.0 | 880 | 15 | 800 |
| 13 | F | 20000 | 20000 | 600 | 500 | 20000 | 680 | NOF | 15 | 400 | 0.6 | 830 | 15 | 3200 |
| 14 | F | 20000 | 20000 | 700 | 500 | 20000 | 750 | DFF | 15 | 400 | 1.5 | 830 | 15 | 4000 |
| 15 | F | 500 | 500 | 650 | 2000 | 500 | 700 | DFF | 15 | 600 | 1.5 | 830 | 15 | 3200 |
| 16 | F | 20000 | 20000 | 350 | 500 | 20000 | 500 | DFF | 15 | 500 | 2.0 | 630 | 15 | 1800 |
| 17 | F | 20000 | 20000 | 770 | 500 | 20000 | 870 | DFF | 15 | 500 | 0.3 | 920 | 15 | 2800 |
| 18 | F | 20000 | 20000 | 650 | 2000 | 20000 | 700 | DFF | 15 | 600 | 0.5 | 800 | 15 | 3300 |
| 19 | F | 20000 | 20000 | 650 | 500 | 20000 | 680 | DFF | 15 | 400 | 1.0 | 830 | 15 | 2800 |
| 20 | F | 20000 | 20000 | 650 | 500 | 20000 | 680 | DFF | 3 | 1500 | 0.5 | 800 | 3 | 3800 |
| 21 | F | 15000 | 20000 | 650 | 600 | 20000 | 680 | DFF | 15 | 500 | 2.0 | 920 | 15 | 2800 |
| 22 | F | 20000 | 20000 | 650 | 400 | 20000 | 700 | DFF | 15 | 600 | 1.2 | 820 | 15 | 2500 |
| 23 | F | 20000 | 20000 | 650 | 300 | 20000 | 680 | DFF | 15 | 600 | 1.0 | 830 | 15 | 450 |
| 24 | F | 20000 | 20000 | 650 | 500 | 20000 | 700 | DFF | 15 | 600 | 0.6 | 810 | 15 | 6500 |
| 25 | F | 20000 | 20000 | 550 | 600 | 20000 | 620 | DFF | 15 | 700 | 0.04 | 640 | 15 | 3500 |
| 26 | F | 20000 | 20000 | 500 | 600 | 20000 | 620 | DFF | 15 | 300 | 0.5 | 680 | 15 | 3200 |
| 27 | A | 20000 | 20000 | 550 | 500 | 20000 | 650 | DFF | 15 | 400 | 0.6 | 710 | 15 | 2500 |
| 28 | A | 20000 | 20000 | 630 | 600 | 20000 | 680 | DFF | 15 | 300 | 0.8 | 780 | 15 | 3200 |
| 29 | B | 20000 | 20000 | 580 | 400 | 20000 | 650 | DFF | 15 | 500 | 0.4 | 750 | 15 | 4000 |
| 30 | B | 20000 | 20000 | 650 | 300 | 20000 | 700 | DFF | 15 | 300 | 1.0 | 830 | 15 | 3000 |
| 31 | C | 20000 | 20000 | 770 | 500 | 20000 | 860 | DFF | 15 | 300 | 0.2 | 900 | 15 | 2500 |
| 32 | C | 20000 | 20000 | 680 | 500 | 20000 | 730 | DFF | 15 | 300 | 0.8 | 850 | 15 | 2800 |
| 33 | D | 20000 | 20000 | 650 | 400 | 20000 | 700 | DFF | 15 | 500 | 0.6 | 820 | 15 | 1800 |
| 34 | D | 20000 | 20000 | 680 | 400 | 20000 | 740 | DFF | 15 | 400 | 0.8 | 830 | 15 | 2800 |
| 35 | D | 20000 | 20000 | 610 | 500 | 20000 | 650 | DFF | 15 | 600 | 1.3 | 830 | 15 | 2300 |
| 36 | E | 20000 | 20000 | 700 | 300 | 20000 | 790 | DFF | 15 | 300 | 0.5 | 850 | 15 | 1800 |
| 37 | G | 25000 | 20000 | 700 | 500 | 20000 | 790 | DFF | 15 | 300 | 0.5 | 850 | 15 | 450 |
| 38 | G | 20000 | 20000 | 700 | 500 | 20000 | 790 | DFF | 15 | 400 | 0.5 | 850 | 15 | 6500 |
| 39 | G | 20000 | 20000 | 700 | 600 | 20000 | 800 | DFF | 15 | 600 | 0.1 | 820 | 15 | 3000 |
| 40 | H | 20000 | 20000 | 700 | 400 | 20000 | 700 | DFF | 15 | 600 | 0.3 | 750 | 15 | 4000 |
| 41 | I | 20000 | 20000 | 620 | 400 | 20000 | 700 | DFF | 15 | 600 | 0.3 | 750 | 15 | 4000 |

Reduction-annealing → Hot-dip

TABLE 2-continued

| No. | Soaking zone Lower H₂O concentration (vol ppm) | Soaking zone H₂O concentration difference (vol ppm) | Soaking zone Average H₂O concentration (vol ppm) | Soaking zone Holding time (sec) | Soaking zone temperature variation (° C.) | galvanizing Effective Al concentration in bath (mass %) | Alloying processing Alloying temperature (° C.) | Alloying processing Alloying time (sec) | Coating appearance | Coating adhesion | TS (MPa) × EL (%) | Endurance ratio | |
|---|---|---|---|---|---|---|---|---|---|---|---|---|---|
| 1 | 1500 | 1300 | 2150 | 100 | −5 | 0.102 | 510 | 20 | ○ | ○ | 14112 | 0.69 | Example |
| 2 | 2800 | 1000 | 3300 | 171 | −10 | 0.105 | 510 | 34 | ○ | ○ | 13325 | 0.68 | Example |
| 3 | 1400 | 1100 | 1950 | 100 | −18 | 0.108 | 520 | 20 | ○ | ○ | 14280 | 0.69 | Example |
| 4 | 3300 | 1500 | 4050 | 120 | −5 | 0.105 | 505 | 24 | ○ | ○ | 13130 | 0.72 | Example |
| 5 | 2500 | 1000 | 3000 | 117 | −8 | 0.105 | 515 | 23 | △ | ○ | 13860 | 0.70 | Example |
| 6 | 1000 | 2200 | 2100 | 71 | −5 | 0.105 | 480 | 14 | ○ | ○ | 13720 | 0.68 | Example |
| 7 | 3700 | 1100 | 4250 | 120 | 16 | 0.103 | 510 | 24 | ○ | ○ | 13130 | 0.64 | Example |
| 8 | 1400 | 1100 | 1950 | 100 | −18 | 0.168 | — | — | ○ | ○ | 14280 | 0.69 | Example |
| 9 | 250 | 190 | 345 | 100 | −5 | 0.170 | — | — | ○ | × | 14400 | 0.71 | Comparative example |
| 10 | 1500 | 300 | 1650 | 200 | −7 | 0.098 | 520 | 40 | ○ | ○ | 13720 | 0.71 | Example |
| 11 | 1400 | 1100 | 1950 | 150 | 5 | 0.097 | 520 | 30 | ○ | ○ | 12870 | 0.64 | Comparative example |
| 12 | 600 | 200 | 700 | 243 | −6 | 0.123 | 560 | 49 | ○ | △ | 12024 | 0.65 | Comparative example |
| 13 | 2900 | 300 | 3050 | 180 | −8 | 0.090 | 490 | 36 | △ | △ | 12000 | 0.62 | Comparative example |
| 14 | 2700 | 1300 | 3350 | 250 | −5 | 0.107 | 500 | 50 | ○ | ○ | 12740 | 0.63 | Example |
| 15 | 2800 | 400 | 3000 | 53 | −8 | 0.108 | 530 | 11 | × | × | 12857 | 0.73 | Comparative example |
| 16 | 1300 | 500 | 1550 | 87 | −6 | 0.101 | 550 | 17 | ○ | × | 12816 | 0.75 | Comparative example |
| 17 | 1600 | 1200 | 2200 | 65 | −3 | 0.103 | 515 | 13 | × | × | 12740 | 0.64 | Comparative example |
| 18 | 2600 | 700 | 2950 | 167 | −4 | 0.110 | 510 | 33 | × | ○ | 11550 | 0.62 | Comparative example |
| 19 | 1800 | 1000 | 2300 | 200 | −13 | 0.105 | 520 | 40 | × | ○ | 13520 | 0.65 | Comparative example |
| 20 | 2800 | 1000 | 3300 | 150 | −10 | 0.109 | 530 | 30 | × | ○ | 12360 | 0.66 | Comparative example |
| 21 | 1400 | 1400 | 2100 | 240 | −7 | 0.108 | 540 | 48 | × | ○ | 14280 | 0.56 | Comparative example |
| 22 | 1900 | 600 | 2200 | 120 | −13 | 0.105 | 530 | 24 | ○ | ○ | 10100 | 0.64 | Comparative example |
| 23 | 200 | 250 | 325 | 100 | −5 | 0.105 | 580 | 20 | ○ | ○ | 11520 | 0.71 | Comparative example |
| 24 | 5300 | 1200 | 5900 | 130 | −2 | 0.105 | 490 | 26 | ○ | ○ | 13720 | 0.54 | Comparative example |
| 25 | 2500 | 1000 | 3000 | 183 | −25 | 0.105 | 510 | 37 | ○ | ○ | 11960 | 0.65 | Comparative example |
| 26 | 1000 | 2200 | 2100 | 500 | −15 | 0.105 | 510 | 100 | × | × | 10560 | 0.65 | Comparative example |
| 27 | 1400 | 1100 | 1950 | 120 | −7 | 0.105 | 490 | 24 | ○ | ○ | 13685 | 0.67 | Example |
| 28 | 2900 | 300 | 3050 | 100 | −4 | 0.105 | 490 | 20 | ○ | ○ | 12663 | 0.66 | Example |
| 29 | 3200 | 800 | 3600 | 125 | −5 | 0.105 | 500 | 25 | ○ | ○ | 13310 | 0.69 | Example |
| 30 | 2000 | 1000 | 2500 | 250 | −8 | 0.108 | 490 | 50 | ○ | ○ | 13464 | 0.70 | Example |
| 31 | 1800 | 700 | 2150 | 130 | −6 | 0.105 | 520 | 26 | ○ | ○ | 13200 | 0.67 | Example |
| 32 | 1800 | 1000 | 2300 | 200 | −2 | 0.105 | 510 | 40 | × | ○ | 12180 | 0.66 | Comparative example |

TABLE 2-continued

| | | | | | | | | | | | | |
|---|---|---|---|---|---|---|---|---|---|---|---|---|
| 33 | 1200 | 600 | 1500 | 150 | −4 | 0.105 | 520 | 30 | ○ | ○ | 12642 | 0.68 | Example |
| 34 | 1500 | 1300 | 2150 | 200 | −10 | 0.105 | 525 | 40 | ○ | ○ | 12992 | 0.71 | Example |
| 35 | 1800 | 500 | 2050 | 113 | −5 | 0.108 | 530 | 23 | ○ | ○ | 13685 | 0.68 | Example |
| 36 | 1500 | 300 | 1650 | 138 | −6 | 0.105 | 490 | 28 | ○ | ○ | 14112 | 0.64 | Example |
| 37 | 200 | 250 | 325 | 120 | −6 | 0.105 | 590 | 24 | ○ | ○ | 10080 | 0.61 | Comparative example |
| 38 | 5300 | 1200 | 5900 | 120 | −7 | 0.105 | 520 | 24 | × | ○ | 13178 | 0.54 | Comparative example |
| 39 | 2500 | 500 | 2750 | 120 | −10 | 0.103 | 530 | 24 | ○ | ○ | 13233 | 0.61 | Example |
| 40 | 3500 | 500 | 3750 | 200 | −3 | 0.108 | 530 | 40 | × | × | 14840 | 0.66 | Comparative example |
| 41 | 3300 | 700 | 3650 | 167 | −8 | 0.109 | 510 | 33 | × | × | 11115 | 0.65 | Comparative example |

Table 2 demonstrates that Examples, although being high-strength steel containing Si and Mn, had excellent coating adhesion, good coating appearance, an excellent balance between strength and ductility, and good fatigue resistance properties. On the other hand, Comparative Examples, which were produced outside the range of the present disclosure, were inferior in at least one of the following: coating adhesion, coating appearance, balance between strength and ductility, and fatigue resistance properties.

INDUSTRIAL APPLICABILITY

The high-strength galvanized steel sheet of the present disclosure has excellent coating adhesion, workability, and fatigue resistance properties and is thus capable of being used as a surface-treated steel sheet for achieving the weight reduction and strength increase of automobile bodies themselves.

The invention claimed is:

1. A method for producing a high-strength galvanized steel sheet, the method comprising:
   obtaining a steel sheet having a chemical composition including:
     C: 0.3% or less, by mass %,
     Si: 0.1 to 2.5%, by mass %,
     Mn: 0.5 to 3.0%, by mass %,
     P: 0.100% or less, by mass %,
     S: 0.0100% or less, by mass %, and
     Fe and incidental impurities;
   performing oxidation processing on the steel sheet;
   after the oxidation processing, performing reduction-annealing on the steel sheet; and
   after the reduction-annealing, performing hot-dip galvanizing processing on the steel sheet,
   wherein:
     the oxidation processing is performed in such a manner that,
       in a first stage, the steel sheet is heated at a temperature of 400 to 750° C. in an atmosphere having an $O_2$ concentration of 1000 ppm by volume or more and a $H_2O$ concentration of 1000 ppm by volume or more, and,
       in a second stage, the steel sheet is heated at a temperature of 600 to 850° C. in an atmosphere having an $O_2$ concentration of less than 1000 ppm by volume and a $H_2O$ concentration of 1000 ppm by volume or more, and
     the reduction-annealing is performed in such a manner that,
       in a heating zone, the steel sheet is heated at a heating rate of 0.1° C./sec or more to a temperature of 650 to 900° C. in an atmosphere having a $H_2$ concentration of 5 to 30 vol % and a $H_2O$ concentration of 10 to 600 ppm by volume with a balance of $N_2$ and incidental impurities, and thereafter,
       in a soaking zone, the steel sheet is soaked and held for 10 to 300 seconds with a temperature variation in the soaking zone of ±20° C. or less in an atmosphere having a $H_2$ concentration of 5 to 30 vol % and a $H_2O$ concentration of 700 to 5000 ppm by volume with a balance of $N_2$ and incidental impurities.

2. The method for producing a high-strength galvanized steel sheet according to claim 1, wherein the heating rate is not more than 1.5° C./sec.

3. The method for producing a high-strength galvanized steel sheet according to claim 1, wherein the chemical composition includes Mn: 2.3 to 3.0%, by mass %.

4. The method for producing a high-strength galvanized steel sheet according to claim 1, wherein the chemical composition of the steel sheet further includes at least one of:
   Al: 0.01 to 0.1%, by mass %,
   Mo: 0.05 to 1.0%, by mass %,
   Nb: 0.005 to 0.05%, by mass %,
   Ti: 0.005 to 0.05%, by mass %,
   Cu: 0.05 to 1.0%, by mass %,
   Ni: 0.05 to 1.0%, by mass %,
   Cr: 0.01 to 0.8%, by mass %,
   B: 0.0005 to 0.005%, by mass %,
   Sb: 0.001 to 0.10%, by mass %, and
   Sn: 0.001 to 0.10%, by mass %.

5. The method for producing a high-strength galvanized steel sheet according to claim 1, wherein the $H_2O$ concentration in the heating zone is 10 ppm by volume or more and less than 500 ppm by volume, and the $H_2O$ concentration in the soaking zone is more than 1000 ppm by volume and 5000 ppm by volume or less.

6. The method for producing a high-strength galvanized steel sheet according to claim 5, wherein the chemical composition of the steel sheet further includes at least one of:
   Al: 0.01 to 0.1%, by mass %,
   Mo: 0.05 to 1.0%, by mass %,
   Nb: 0.005 to 0.05%, by mass %,
   Ti: 0.005 to 0.05%, by mass %,
   Cu: 0.05 to 1.0%, by mass %,
   Ni: 0.05 to 1.0%, by mass %,
   Cr: 0.01 to 0.8%, by mass %,
   B: 0.0005 to 0.005%, by mass %,
   Sb: 0.001 to 0.10%, by mass %, and
   Sn: 0.001 to 0.10%, by mass %.

7. The method for producing a high-strength galvanized steel sheet according to claim 1, wherein the oxidation processing is performed in a direct fired furnace (DFF) or a non-oxidation furnace (NOF), and an air ratio in the first stage is 1.0 or more and less than 1.3 and an air ratio in the second stage is 0.7 or more and less than 0.9.

8. The method for producing a high-strength galvanized steel sheet according to claim 7, wherein the chemical composition of the steel sheet further includes at least one of:
   Al: 0.01 to 0.1%, by mass %,
   Mo: 0.05 to 1.0%, by mass %,
   Nb: 0.005 to 0.05%, by mass %,
   Ti: 0.005 to 0.05%, by mass %,
   Cu: 0.05 to 1.0%, by mass %,
   Ni: 0.05 to 1.0%, by mass %,
   Cr: 0.01 to 0.8%, by mass %,
   B: 0.0005 to 0.005%, by mass %,
   Sb: 0.001 to 0.10%, by mass %, and
   Sn: 0.001 to 0.10%, by mass %.

9. The method for producing a high-strength galvanized steel sheet according to claim 1, wherein, in the soaking zone for the reduction-annealing, a difference in the $H_2O$ concentration between upper and lower sections is 2000 ppm by volume or less.

10. The method for producing a high-strength galvanized steel sheet according to claim 9, wherein the chemical composition of the steel sheet further includes at least one of:
   Al: 0.01 to 0.1%, by mass %,
   Mo: 0.05 to 1.0%, by mass %, Nb: 0.005 to 0.05%, by mass %,
Ti: 0.005 to 0.05%, by mass %,
Cu: 0.05 to 1.0%, by mass %,
Ni: 0.05 to 1.0%, by mass %,
Cr: 0.01 to 0.8%, by mass %,
B: 0.0005 to 0.005%, by mass %,
Sb: 0.001 to 0.10%, by mass %, and
Sn: 0.001 to 0.10%, by mass %.

11. The method for producing a high-strength galvanized steel sheet according to claim 1, wherein the hot-dip galvanizing processing is performed in a hot-dip galvanizing bath having a chemical composition containing an effective Al concentration in the bath of 0.095 to 0.175 mass %, with a balance of Zn and incidental impurities.

12. The method for producing a high-strength galvanized steel sheet according to claim 11, wherein the chemical composition of the steel sheet further includes at least one of:
Al: 0.01 to 0.1%, by mass %,
Mo: 0.05 to 1.0%, by mass %,
Nb: 0.005 to 0.05%, by mass %,
Ti: 0.005 to 0.05%, by mass %,
Cu: 0.05 to 1.0%, by mass %,
Ni: 0.05 to 1.0%, by mass %,
Cr: 0.01 to 0.8%, by mass %,
B: 0.0005 to 0.005%, by mass %,
Sb: 0.001 to 0.10%, by mass %, and
Sn: 0.001 to 0.10%, by mass %.

13. The method for producing a high-strength galvanized steel sheet according to claim 1,
wherein the hot-dip galvanizing processing is performed in a hot-dip galvanizing bath having a chemical composition containing an effective Al concentration in the bath of 0.095 to 0.115 mass %, with a balance of Zn and incidental impurities, and
thereafter alloying processing is performed for 10 to 60 seconds at a temperature T (° C.), which satisfies the following formula:

$$-50\ \log([H_2O])+650 \leq T \leq -40\ \log([H_2O])+680$$

where $[H_2O]$ represents a $H_2O$ concentration (ppm by volume) in the soaking zone during the reduction-annealing.

14. The method for producing a high-strength galvanized steel sheet according to claim 13, wherein the chemical composition of the steel sheet further includes at least one of:
Al: 0.01 to 0.1%, by mass %,
Mo: 0.05 to 1.0%, by mass %,
Nb: 0.005 to 0.05%, by mass %,
Ti: 0.005 to 0.05%, by mass %,
Cu: 0.05 to 1.0%, by mass %,
Ni: 0.05 to 1.0%, by mass %,
Cr: 0.01 to 0.8%, by mass %,
B: 0.0005 to 0.005%, by mass %,
Sb: 0.001 to 0.10%, by mass %, and
Sn: 0.001 to 0.10%, by mass %.

* * * * *